(12) United States Patent
Mahanta et al.

(10) Patent No.: US 12,235,815 B2
(45) Date of Patent: Feb. 25, 2025

(54) GRAPH-BASED APPLICATION PERFORMANCE OPTIMIZATION PLATFORM FOR CLOUD COMPUTING ENVIRONMENT

(71) Applicant: SAP SE, Walldorf (DE)

(72) Inventors: Prabal Mahanta, Bengaluru (IN); Suchin Chouta, Udupi (IN)

(73) Assignee: SAP SE, Walldorf (DE)

( * ) Notice: Subject to any disclaimer, the term of this patent is extended or adjusted under 35 U.S.C. 154(b) by 395 days.

(21) Appl. No.: 16/815,687

(22) Filed: Mar. 11, 2020

(65) Prior Publication Data

US 2021/0286785 A1  Sep. 16, 2021

(51) Int. Cl.
| | |
|---|---|
| *G06F 16/21* | (2019.01) |
| *G06F 11/36* | (2006.01) |
| *G06F 16/28* | (2019.01) |
| *G06N 5/04* | (2023.01) |
| *G06Q 10/04* | (2023.01) |
| *G06Q 10/10* | (2023.01) |

(52) U.S. Cl.
CPC ........ *G06F 16/217* (2019.01); *G06F 11/3612* (2013.01); *G06F 11/3664* (2013.01); *G06F 16/288* (2019.01); *G06N 5/04* (2013.01); *G06Q 10/04* (2013.01); *G06Q 10/10* (2013.01)

(58) Field of Classification Search
CPC .... G06F 16/27; G06F 16/288; G06F 11/3612; G06F 11/3664; G06F 16/217; G06N 5/04; G06Q 10/04; G06Q 10/10
See application file for complete search history.

(56) References Cited

U.S. PATENT DOCUMENTS

| | | | |
|---|---|---|---|
| 9,734,021 B1* | 8/2017 | Sanocki | H04L 41/0654 |
| 10,452,563 B1* | 10/2019 | McCall | G06N 20/00 |
| 2011/0231280 A1* | 9/2011 | Farah | G06Q 40/12 |
| | | | 705/26.8 |
| 2015/0019912 A1* | 1/2015 | Darling | G06F 11/3684 |
| | | | 714/26 |
| 2016/0301732 A1* | 10/2016 | Moretto | H04L 43/50 |
| 2020/0250747 A1* | 8/2020 | Padmanabhan | G06N 5/04 |
| 2021/0201270 A1* | 7/2021 | Cross | G06N 20/20 |

* cited by examiner

*Primary Examiner* — Courtney Harmon
(74) *Attorney, Agent, or Firm* — Buckley, Maschoff & Talwalkar LLC

(57) ABSTRACT

Some embodiments are associated with application performance optimization in a cloud computing environment. A transaction observer platform may receive transaction information associated with execution of an application in the cloud computing environment A classifier recorder and tagger platform, coupled to the transaction observer platform, may then automatically tag the transaction information. A graph engine relation builder platform, coupled to the transaction observer platform and the classifier recorder and tagger platform, may receive the tagged transaction information and automatically create graph information that represents execution of the application. A recommendation engine platform, coupled to the graph engine relation builder platform, may then receive the graph information and automatically generate and transmit an application performance optimization recommendation.

20 Claims, 10 Drawing Sheets

TRANSACTION MODEL

For a Transaction from Y → Z

Weight W of failure = 0.10(if SS > FS and FS ~ 0%) + 0.10(if SD > FD and FD ~0%)
= 0.70(if SS > FS and FS > 50%) + 0.70(if SD > FD and FD ~ 50%)
= 0.90(if SS > FS and FS ~ 70%) + 0.90(if SD > FD and FD ~ 70%)
= 0.99 (otherwise)

*FIG. 7*

GRAPH-BASED APPLICATION PERFORMANCE OPTIMIZATION PLATFORM FOR CLOUD COMPUTING ENVIRONMENT

BACKGROUND

An enterprise may execute applications using a cloud computing environment. For example, the applications might be associated with financial tasks, human resources procedures, manufacturing supply chains, etc. The performance of an application may depend on one or more configure parameters (e.g., dedicated cloud resources, buffer sizes) which can vary widely depending on the execution characteristics of the application. Note that optimization of any application based on "corner cases" (where a test strategy is not formidable to carry out necessary recommendations and/or with the introduction of big data-based applications) can be difficult. As used herein, the phrase "corner case" may refer to a situation that occurs only outside of normal operating parameters—such as one that manifests itself when multiple environmental variables or conditions are simultaneously at extreme levels (even though each parameter is within an allowed range).

For example, it may be difficult to manage the performance of any machine learning based applications. Note that when a new scenario in any machine learning application is evaluated, it may not be possible to understand key parameters (e.g., cache misses) without putting the system into a crash state due to a poor selection of data structures and graph algorithms. Also, systems rarely investigate error logs and co-relate that information with the associated transactions to understand the key reasons of failure (and also to take into consideration the partitions and/or classifications, such as cold and hot data). Without co-relating the data-error to a combination of algorithm-data structure that is used for an application, it may be impractical deliver workarounds for a current setup of a framework and a platform while simultaneously performing optimization (e.g., due to the limiting nature of some platforms and libraries).

Often, a system is not able to evaluate key data structures and/or algorithm during an architectural decision phase along with a feasible prototype (because a simulated environment is not available to predict customer data volume and/or trace the nature of accessibility of the data based on simulated customer behavior). While there are models, data structures, and procedures that are limited to a specific provider platform, generalizing the notion of customizable delivery based on customer behavior is not possible without the intervention of a framework that tries to understand the simulations and recommend a best case scenario for and optimal algorithm and data structure to solve particular transaction bottlenecks in an application. Moreover, manually determining optimum configuration parameters for an application executing in a cloud computing environment can be a time consuming and error prone task, especially when there are a substantial number of applications, execution characteristics, and/or configure parameters that need to be considered. It would therefore be desirable to provide an automated performance optimization recommendation associated with an application executing in cloud-computing environment in a more efficient and effective manner.

SUMMARY

Some embodiments are associated with application performance optimization in a cloud computing environment. A transaction observer platform may receive transaction information associated with execution of an application in the cloud computing environment. A classifier recorder and tagger platform, coupled to the transaction observer platform, may then automatically tag the transaction information. A graph engine relation builder platform, coupled to the transaction observer platform and the classifier recorder and tagger platform, may receive the tagged transaction information and automatically create graph information that represents execution of the application. A recommendation engine platform, coupled to the graph engine relation builder platform, may then receive the graph information and automatically generate and transmit an application performance optimization recommendation.

Some embodiments comprise: means for receiving, at a transaction observer platform, transaction information associated with execution of an application in the cloud computing environment; means for automatically tagging the transaction information by a classifier recorder and tagger platform; means for receiving the tagged transaction information and automatically creating, by a graph engine relation builder platform, graph information representing execution of the application; and means for receiving the graph information and automatically generating and transmitting, by a recommendation engine platform, an application performance optimization recommendation.

Some technical advantages of some embodiments disclosed herein are improved systems and methods to provide an automated performance optimization recommendation associated with an application executing in cloud-computing environment in an efficient and effective manner.

BRIEF DESCRIPTION OF THE DRAWINGS

FIG. 7 is an example of failure weights associated with a transaction model in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
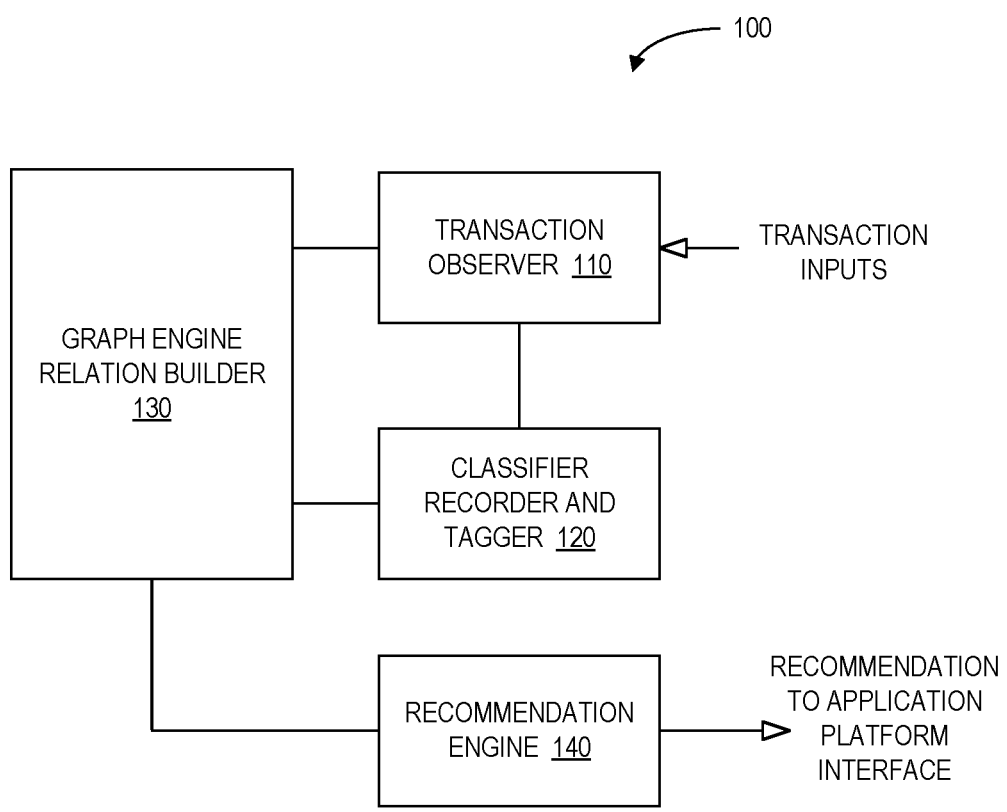
FIG. 1 is a high-level system architecture in accordance with some embodiments.

Embodiments described herein may automatically generate a performance optimization recommendation associated with an application executing in cloud-computing environment. For example, FIG. 1 is a high-level system 100 architecture in accordance with some embodiments. The system 100 includes a transaction observer 110 that receives transaction inputs associated with execution of an application in a cloud computing environment. The transaction observer 110 may, for example, consume any monitoring service statistics server to optimize operation (e.g., and log database writes and reads).

A classifier recorder and tagger 120 may then label the transaction inputs. For example, machine learning modules may be built in Structured Query Language ("SQL") procedures to optimize computation time. A graph engine relation builder 130 may then automatically create graph information representing execution of the application. For example, a graph database service may be consumed to optimize for multi-tenant level operation. A recommendation engine 140 may receive the graph information and automatically generate and transmit an application performance optimization recommendation. For example, a database analytical engine may be consumed to optimize operation. As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system may store information into and/or retrieve information from various data stores, which may be locally stored or reside remote from those elements. Although a single transaction observer 110, classification recorder and tagger 120, graph engine relation builder 130, and recommendation engine 140 are shown in FIG. 1, any number of such devices may be included. Moreover, various devices described herein might be combined according to embodiments of the present invention. For example, in some embodiments, the transaction observer 110 and classification recorder and tagger 120 might comprise a single apparatus. The system 100 functions may be performed by a constellation of networked apparatuses, such as in a distributed processing or cloud-based architecture.

According to some embodiments, an operator or administrator may access the system 100 via a remote device (e.g, a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations, alerts, or results from the system 100.

Figure 2:
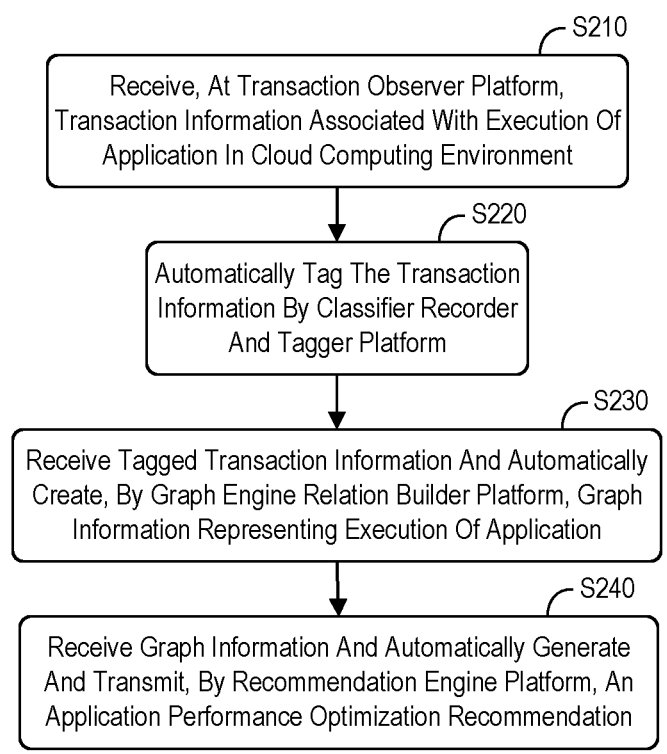
FIG. 2 is a method according to some embodiments.

FIG. 2 is a method that might be performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a transaction observer platform may receive transaction information associated with execution of an application in the cloud computing environment. According to some embodiments, the transaction information received by the transaction observer platform is associated with storage clusters, application databases, execution logs, database writes and reads, etc. Note that the transaction information might include input events, sequential events, read events, successful sequential events, failure sequential events, successful disjointed events, failure disjointed events, etc.

At S220, a classifier recorder and tagger platform may automatically tag the transaction information. The classifier recorder and tagger platform might, for example, identify cache misses, system crashes, weighted transaction failures, etc. At S230, a graph engine relation builder platform may receive the tagged transaction information and automatically create graph information representing execution of the application. At S240, a recommendation engine platform may receive the graph information and automatically generate and transmit an application performance optimization recommendation. According to some embodiments, the application performance optimization recommendation is transmitted to an application platform interface.

Thus, some embodiments may provide a framework to accomplish the task of performance optimization recommendations using the following modules:
- a transaction observer,
- a classifier and tagger,
- a graph engine relation builder (e.g., working alongside a data structure set), and
- a recommendation engine using knowledge databases (e.g., an algorithm data set and a recommendation data set).

Figure 3:
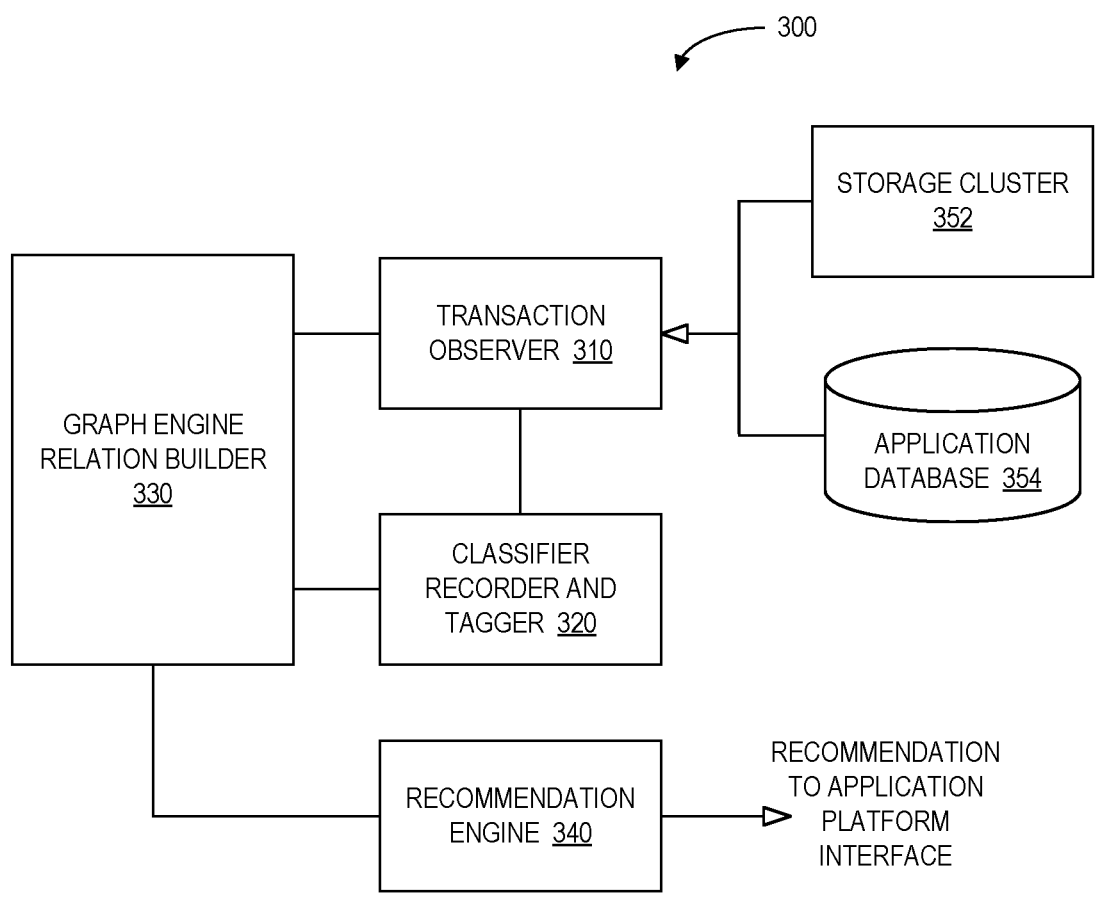
FIG. 3 is a system including transaction observer data sources in accordance with some embodiments.

FIG. 3 is a system 300 including transaction observer data sources in accordance with some embodiments. As before, the system 300 includes a transaction observer 310 that receives transaction inputs associated with execution of an application in a cloud computing environment. In this embodiment, the transaction inputs are received in connection with storage clusters 352 and application databases 354. A classifier recorder and tagger 320 may then label the transaction inputs. A graph engine relation builder 330 may then automatically create graph information representing execution of the application. A recommendation engine 340 may receive the graph information and automatically generate and transmit an application performance optimization recommendation.

In this way, the framework may observe all the transactions (either log or database) done by the application. It keeps a check for the cache misses and system crashes and, based on this learning, fine tunes recommendations. The optimizations theory may be built on top of general application development grievances. Embodiments may also look to optimize offerings and platform limitations using the idea of a custom framework for aiding application optimization at a back-end level as a daemon operation.

Figure 4:
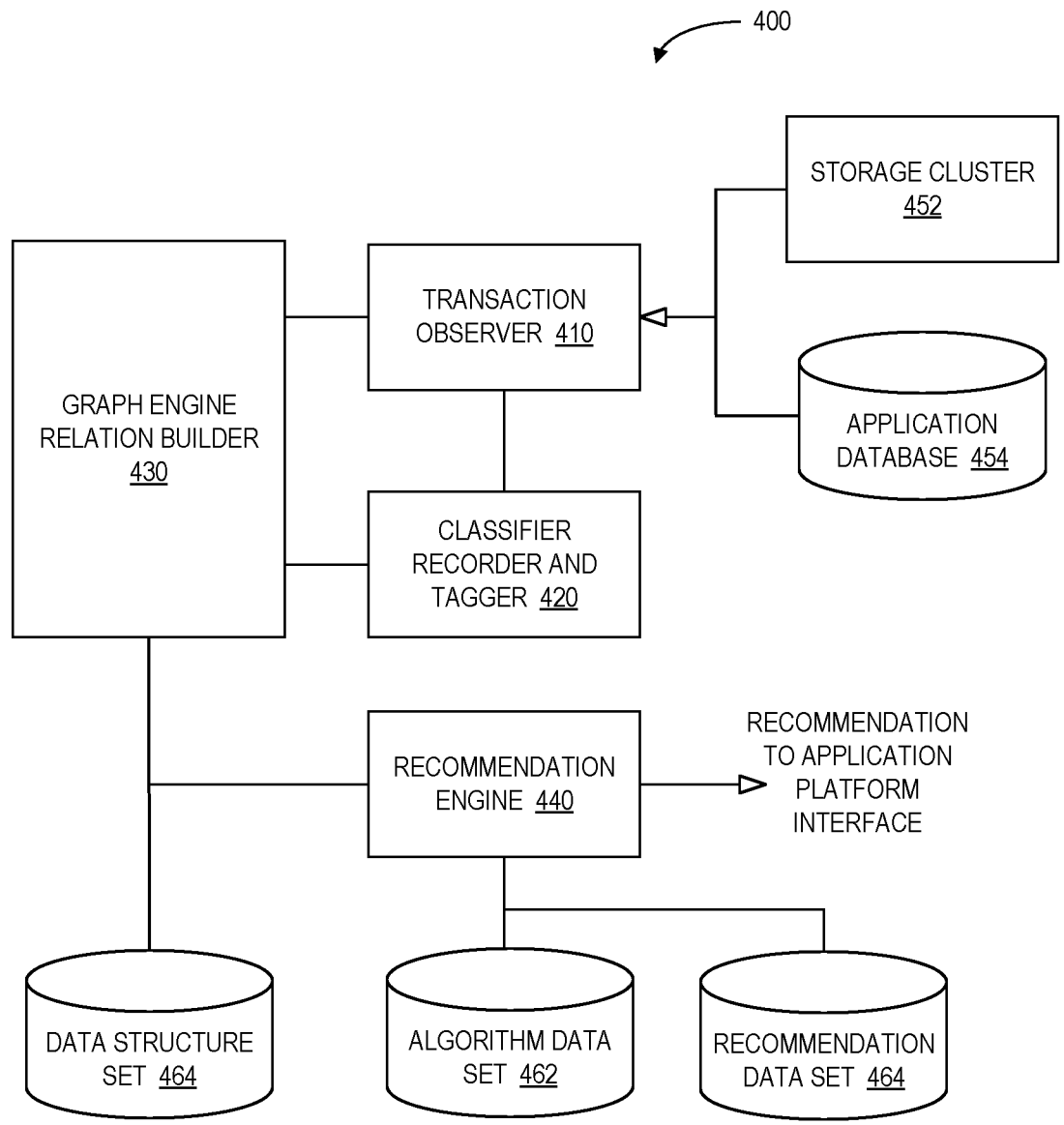
FIG. 4 is a system including various data sets according to some embodiments.

FIG. 4 is a system 400 including various data sets according to some embodiments. As before, the system 400 includes a transaction observer 410 that receives transaction inputs associated with execution of an application in a cloud computing environment. In this embodiment, the transaction inputs are received in connection with storage clusters 452 and application databases 454. A classifier recorder and tagger 420 may then label the transaction inputs. A graph engine relation builder 430 may then automatically create graph information representing execution of the application (and may access a data structure set 464). A recommendation engine 440 may receive the graph information (and access an algorithm data set 462 and a recommendation data set 464) and automatically generate and transmit an application performance optimization recommendation.

Figure 5:
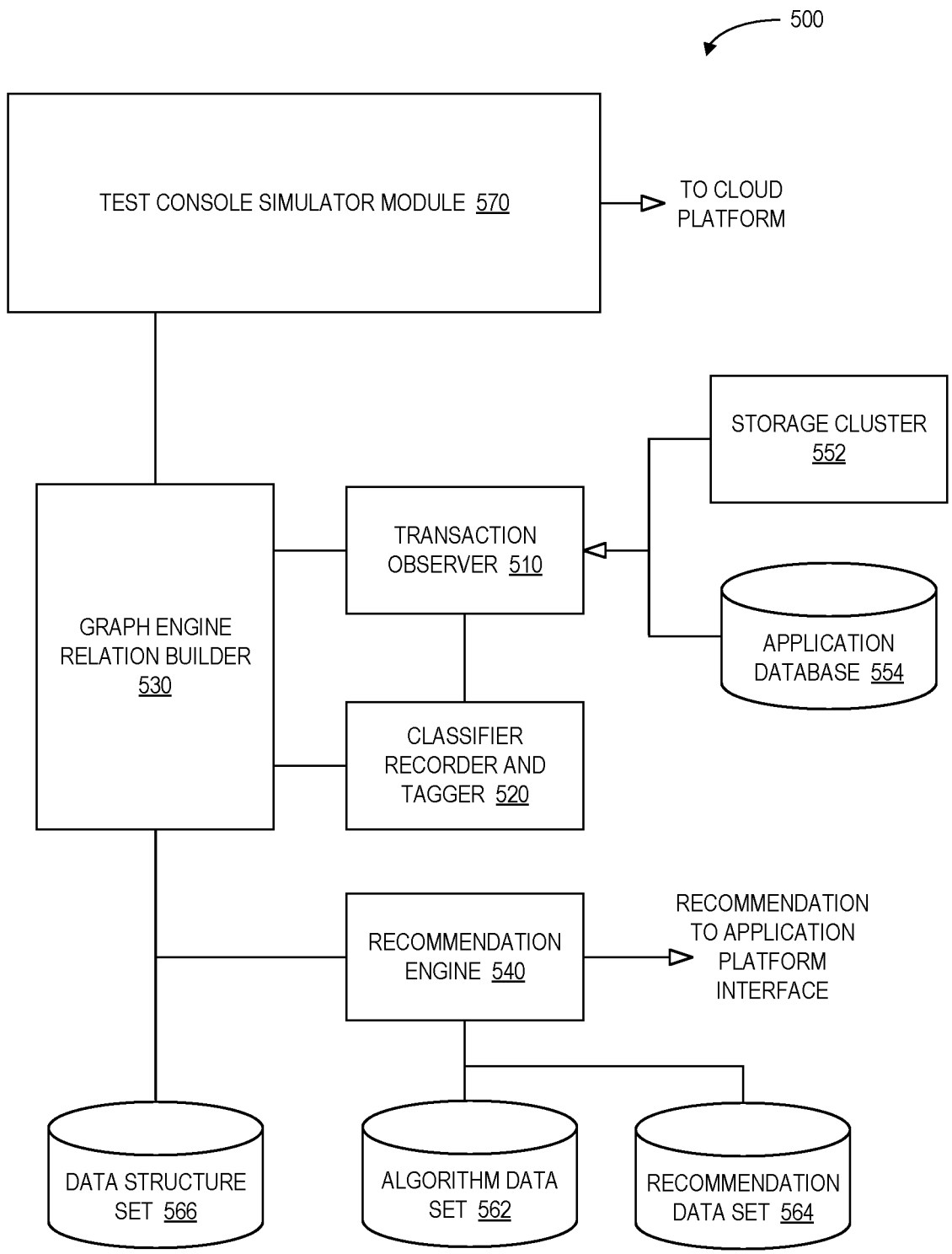
FIG. 5 is a system including a test console simulator module in accordance with some embodiments.

FIG. 5 is a system 500 including a test console simulator module in accordance with some embodiments. As before, the system 500 includes a transaction observer 510 that receives transaction inputs associated with execution of an application in a cloud computing environment. In this embodiment, the transaction inputs are received in connection with storage clusters 552 and application databases 554. A classifier recorder and tagger 520 may then label the transaction inputs. A graph engine relation builder 530 may then automatically create graph information representing execution of the application (and may access a data structure set 564). A recommendation engine 540 may receive the graph information (and access an algorithm data set 562 and a recommendation data set 564) and automatically generate and transmit an application performance optimization recommendation. According to this embodiment, a test console simulator module 570 receives data from the graph engine relation builder 530 and provides information to a cloud platform.

Note that substantially real-time simulation of overall product performance may be a key aspect missing from development process. This is because A system would not be able to leverage infrastructure because of associated high cost and resource issues. High performance modelling, simulation based on user behavior, and/or automated test scenarios may be important to improve the real-time performance of any product while also addressing scaling issues in critical scenarios. High-performance modeling and simulating customer scenarios may help find bugs and bottlenecks in the system. In some embodiments, the system may simulate in a self-tear down enabled environment (e.g., on a hypervisor or a container environment).

Figure 6:
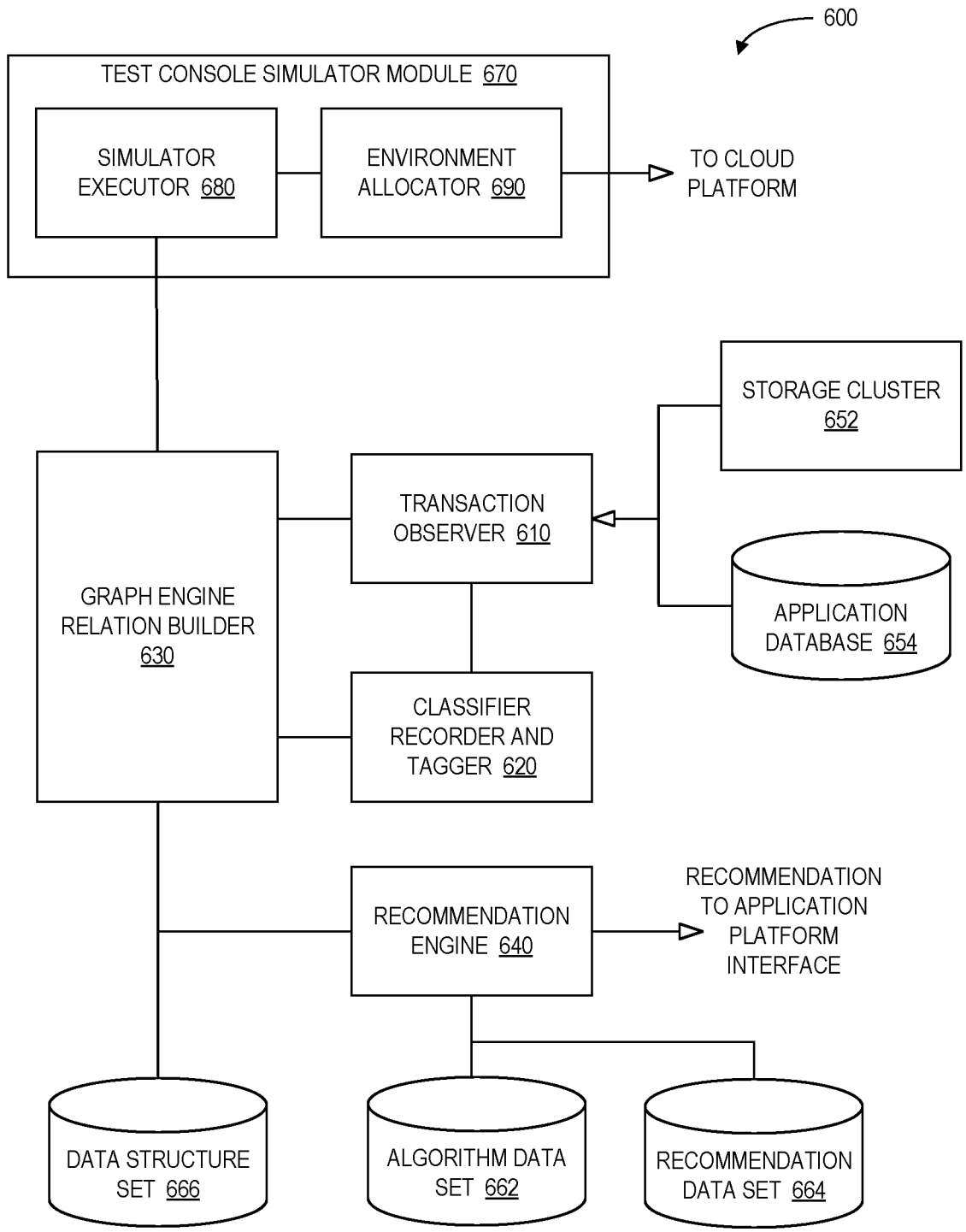
FIG. 6 is a system including more details about the test console simulator module according to some embodiments.

FIG. 6 is a system 600 including more details about the test console simulator module according to some embodiments. As before, the system 600 includes a transaction observer 610 that receives transaction inputs associated with execution of an application in a cloud computing environment. In this embodiment, the transaction inputs are received in connection with storage clusters 652 and application databases 654. A classifier recorder and tagger 620 may then label the transaction inputs. A graph engine relation builder 630 may then automatically create graph information representing execution of the application (and may access a data structure set 664). A recommendation engine 640 may receive the graph information (and access an algorithm data set 662 and a recommendation data set 664) and automatically generate and transmit an application performance optimization recommendation. According to this embodiment, a test console simulator module 670 receives data from the graph engine relation builder 630 and provides information to a cloud platform. In particular, a simulator executor 680 may receive information from the graph engine relation builder 630 and an environment allocation 690 may consume and Infrastructure as a Service ("IaaS") to either build or tear down a system in any specific cloud platform or container environment (e.g., self-controlled).

The transaction observer 610 may comprise a mechanism to establish user behavior tracking based on database access. Every event is recorded in terms of states where read and subsequent write within a context has sequential state (whereas otherwise it would be a disjointed state). Embodiments might be modeled based on the following structure (assuming M is a model and A represents a set of input events):

S represents a set of sequential events.
D represents a set of read events only,
SS represents Successful Sequential events,
FS represents Failure Sequential events.
SD represents Successful Disjointed events, and
FD represents Failure Disjointed events.

In this case, FIG. 7 is an example of failure weights associated with a transaction model 700 in accordance with some embodiments for a transaction from Y→Z. In this way, the system may keep a track of how events A are impacting the outcomes with the help of weights so the each session S will be assigned a weight and tagged with set of events A for a simulating a particular user (and events can be segregated to represented multiple outcomes).

Referring again to FIG. 6, the classifier recorder and tagger 620 may perform event failure scenario tagging based on a learning set of expected error messages and an overall set of whether there were any false positives in the simulated environment for a particular scenario and a particular user. In a concurrent user scenario, the classifier recorder and tagger 620 may treat the tags to segregate the user scenarios.

For user K, scenarios S with events E, a matrix will be designed as follows:

$$M = [OE \ldots O_{Ez}]$$

Using this matrix M, where outcomes are achieved per event for a scenario S for a user K, an event-event network may be designed which will result in a rating of the event and a prediction of whether an event will be successful or not.

Each M may be associated with a specific scenario, and this would then be curated for another scenario S2 (where the system will then apply a knowledge neural network model fitment to achieve a neighborhood model). Now using the above dataset, the system may build graph models for the user scenarios to help understand (in a time-based pattern) where to fit a code model to automatically detect the key issues in the code base (and drill down to the level of class in Java a Java application is to undergo this approach).

In order to achieve a cluster of such recommendations using graph data, the system may implement a goal-based analysis where the goal is defined by the product requirements in JavaScript Object Notation ("JSON") for metering and measuring the features of the system. Here, the system may start with a graph G with no negative edge-E (which may be important to enable cluster identification and also can be used for the recommendation process). A local optimization clustering module may be defined such that all of the errors and nonpositive outcomes are considered, and a random initial clustering may be performed. The nodes in the clusters may then be interchanged (which may be critical to understand the quality Q of each cluster) and the cluster can be refined as the quality Q of the model increases. Based on the dependency, the system might have positive and negative weights for the dependencies.

Using the models M, events E, scenarios S, and users U, systems may create neural networks and also model a matrix along with neighborhood weights. This may improve an understanding of how the events work. This may also help model the code semantics to map it to the events which can by done by considering an Abstract Syntax Tree ("AST"). The recommendation engine 640 may use the AST taxonomy and tag the binary tree with Event and Scenario identifiers to detect the issue. The ability to detect the exact line number might be done by use of a debugger which will navigate through the code C using the AST $B_t$ using the Tag-EV/SC. Using rule configurations, datacenter application configuration per platform, the system may use a query engine to produce an annotation based on the availability of capacity and network in a hyper-scaler platform. After the query annotations, a workload Json may also be created to be routed through the simulator executor 680 and environment allocator 690 to proceed with the allocation of capacity and network to the application (and trigger the simulation).

Figure 8:
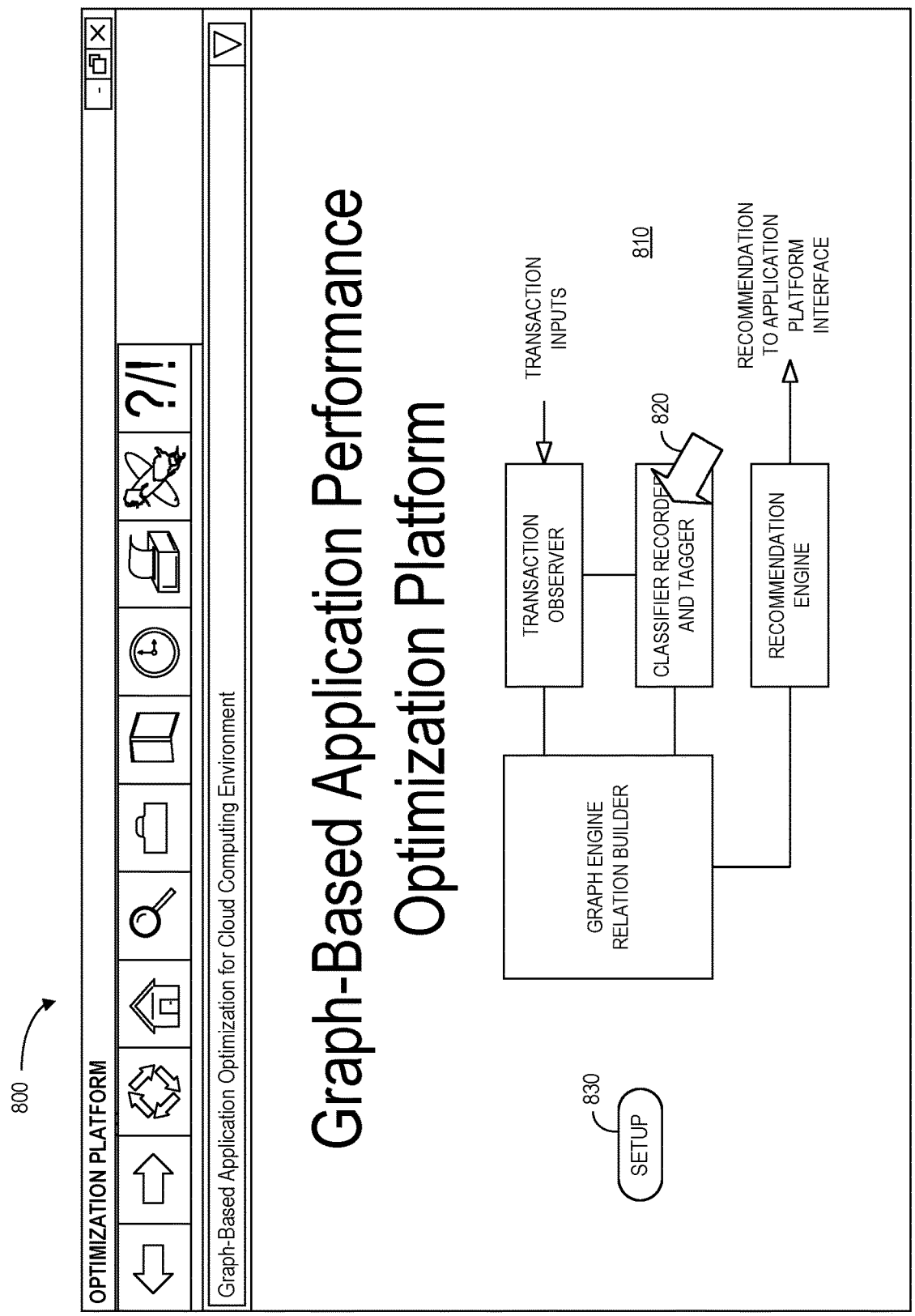
FIG. 8 is a human machine interface display in accordance with some embodiments.

According to some embodiments, an operator or administrator might setup or adjust the operation of an optimization system. For example, FIG. 8 is a human machine interface display 800 in accordance with some embodiments. The display 800 includes a graphical representation 810 of elements of an optimization system (e.g., associated with a transaction observer, classifier recorder and tagger, etc.). Selection of an element (e.g., via a touchscreen or computer pointer 820) may result in display of a pop-up window containing various options (e.g., to adjust rules or logic, assign various devices, change weighting algorithms or a labeling process, etc.). The display 800 may also include a user-selectable "Setup" icon 830 (e.g., to configure parameters for system optimization as described with respect any of the embodiments of FIGS. 1 through 7).

Figure 9:
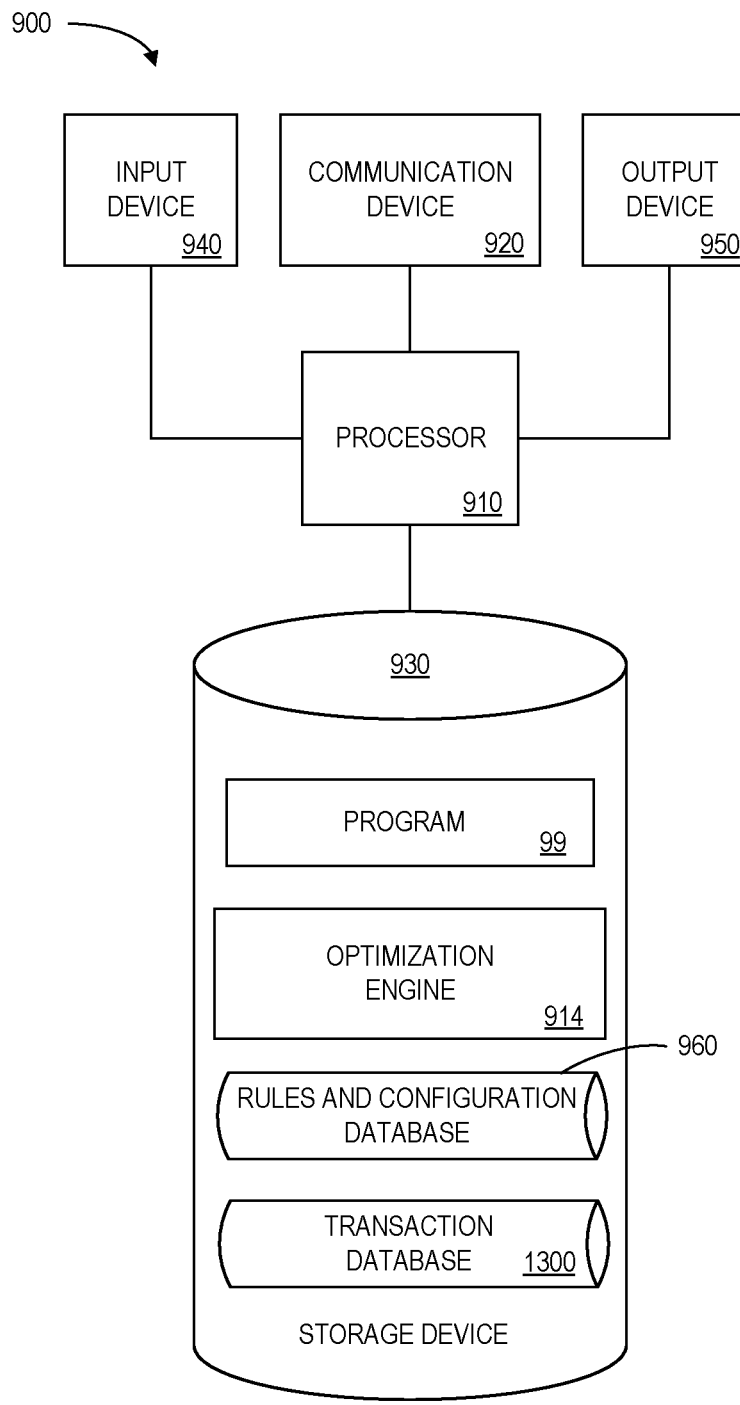
FIG. 9 is an apparatus or platform according to some embodiments.

Note that the embodiments described herein may be implemented using any number of different hardware configurations. For example, FIG. 9 is a block diagram of an apparatus or platform 900 that may be, for example, associated with the system 100 of FIG. 1 (and/or any other system described herein). The platform 900 comprises a processor 910, such as one or more commercially available CPUs in the form of one-chip microprocessors, coupled to a communication device 920 configured to communicate via a communication network (not shown in FIG. 9). The communication device 920 may be used to communicate, for example, with one or more remote user platforms, transaction data sources, etc. The platform 900 further includes an input device 940 (e.g., a computer mouse and/or keyboard to input rules or logic) and/an output device 950 (e.g., a computer monitor to render a display, transmit recommendations or alerts, and/or create enterprise reports). According to some embodiments, a mobile device and/or PC may be used to exchange information with the platform 900.

The processor 910 also communicates with a storage device 930. The storage device 930 can be implemented as a single database or the different components of the storage device 930 can be distributed using multiple databases (that is, different deployment information storage options are possible). The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or an optimization engine 914 for controlling the processor 910. The processor 910 performs instructions of the programs 912, 914, and thereby operates in accordance with any of the embodiments described herein. For example, the processor 910 might may receive transaction information associated with execution of an application in a cloud computing environment. The processor 910 may then automatically tag the transaction information. The processor 910 may receive the tagged transaction information and automatically create graph information that represents execution of the application. According to some embodiments, the processor 910 automatically generates and transmits an application performance optimization recommendation.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as the one shown in FIG. 9), the storage device 930 further stores a rules and configuration database 960 and a transaction database 1000. An example of a database that may be used in connection with the platform 900 will now be described in detail with respect to FIG. 10. Note that the database described herein is only one example, and additional and/or different information may be stored therein. Moreover, various databases might be split or combined in accordance with any of the embodiments described herein.

Figure 10:
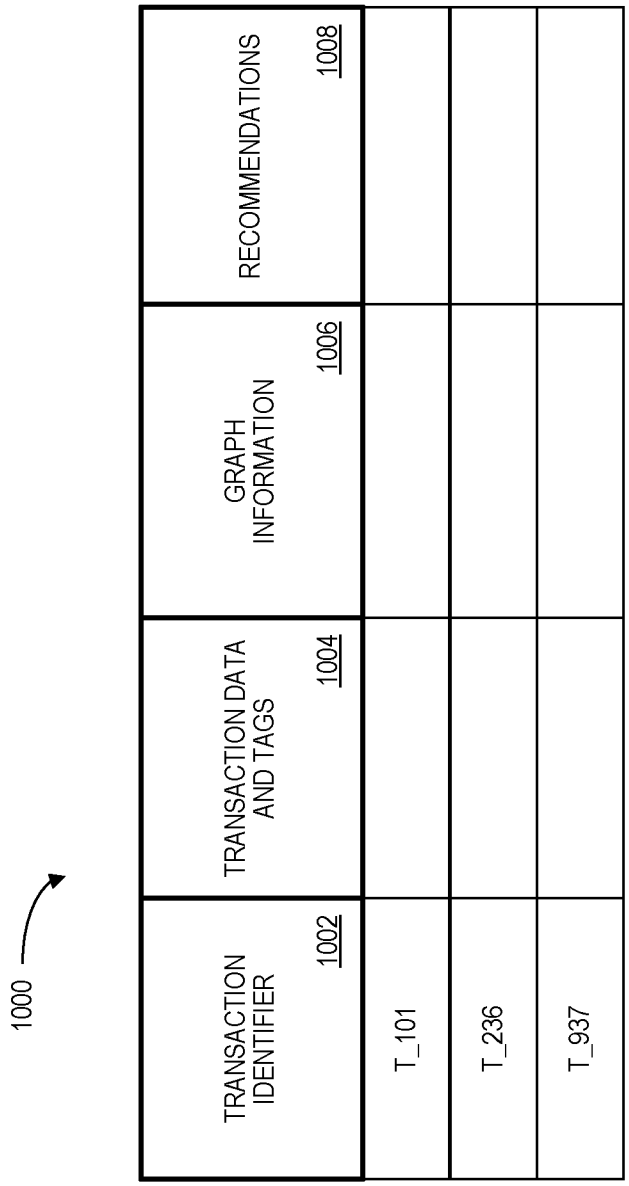
FIG. 10 illustrates a transaction database in accordance with some embodiments.

Referring to FIG. 10, a table is shown that represents the transaction database 1000 that may be stored at the platform 1000 according to some embodiments. The table may include, for example, entries identifying business transaction information. The table may also define fields 1002, 1004, 1006, 1008, for each of the entries. The fields 1002, 1004, 1006, 1008 may, according to some embodiments, specify: a transaction identifier 1002, transaction data and tags 1004, graph information 1006, and recommendations 1008. The transaction database 1000 may be created and updated, for example, when new application data is received, an operator or administrator updates parameters, etc.

The transaction identifier 1002 might be a unique alphanumeric label or link that is associated with execution of a transaction by an application. The transaction data and tags 1004 might have been generated, for example, by a classifier recorder and tagger. The graph information 1006 might have been generated, for example, by a graph engine relation builder. The recommendations 1008 might comprise configuration parameters (buffer sizes, cloud resource allocations, etc.) that were automatically calculated by a recommendation engine to optimize performance of an application executing in a cloud computing environment.

Thus, embodiments may provide a framework to understand simulations and recommend a best-case scenario for an optimal algorithm and data structure to solve a particular transaction bottleneck in an application.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with application performance optimization in a cloud computing environment, comprising:
    a transaction observer platform to receive transaction information associated with execution of an application in the cloud computing environment, the transaction information comprising a plurality of log or database transactions performed during execution of the application;
    a classifier recorder and tagger platform, coupled to the transaction observer platform, to automatically tag the transaction information, and to identify one or more cache misses;
    a graph engine relation builder platform, coupled to the transaction observer platform and the classifier recorder and tagger platform, to receive the tagged transaction information and automatically create graph information representing execution of the application, the graph information comprising a graph model having a plurality of nodes and edges disposed between the plurality of nodes, each of the edges being associated with a weighted dependency, the graph engine relation builder platform to refine the graph model responsive to processing a plurality of event failure scenarios and a learning set of expected error messages, wherein in response to refining the graph model, at least one of the edges being associated with a negative value weighted dependency; and
    a recommendation engine platform, coupled to the graph engine relation builder platform, to receive the graph information and automatically generate and transmit an application performance optimization recommendation based, at least in part, on identification of the one or more cache misses or system crashes.

2. The system of claim 1, wherein the transaction information received by the transaction observer platform is associated with at least one of: (i) storage clusters, (ii) application databases, (iii) execution logs, and (iv) database writes and reads.

3. The system of claim 2, wherein the transaction information includes at least one of: (i) input events, (ii) sequential events, (iii) read events, (iv) successful sequential events, (v) failure sequential events, (vi) successful disjointed events, and (vii) failure disjointed events.

4. The system of claim 1; wherein the classifier recorder and tagger platform further identifies at least one weighted transaction failure.

5. The system of claim 1, wherein the recommendation engine platform is further coupled to an algorithm data set and a recommendation data set.

6. The system of claim 1; wherein the graph engine relation builder platform is further coupled to a data structure set.

7. The system of claim 1, Wherein a test console simulator module receives information from the graph engine relation builder platform and provides data to a cloud platform.

8. The system of claim 7; wherein the test console simulator module includes:
    a simulator executor to receive the information from the graph engine relation builder platform and executes a simulation in at least one of: (i) a hypervisor environment and (ii) a container environment, and
    an environment allocator to receive information about a simulation execution and to provide the data to the cloud platform.

9. The system of claim 1; wherein the application performance optimization recommendation is transmitted to an application platform interface.

10. A computer-implemented method associated with application performance optimization in a cloud computing environment, comprising:
    receiving, at a transaction observer platform, transaction information associated with execution of an application in the cloud computing environment, the transaction information comprising a plurality of log or database transactions performed during execution of the application;
    automatically tagging the transaction information by a classifier recorder and tagger platform and identifying one or more cache misses;
    receiving the tagged transaction information and automatically creating, by a graph engine relation builder platform, graph information representing execution of the application, the graph information comprising a graph model having a plurality of nodes and edges disposed between the plurality of nodes, each of the edges being associated with a weighted dependency, the graph engine relation builder platform to refine the graph model responsive to processing a plurality of event failure scenarios and a learning set of expected error messages, wherein in response to refining the graph model, at least one of the edges being associated with a negative value weighted dependency; and
    receiving the graph information and automatically generating and transmitting, by a recommendation engine platform, an application performance optimization recommendation based, at least in part, on identification of the one or more cache misses or system crashes.

11. The method of claim 10, wherein the transaction information received by the transaction observer platform is associated with at least one of: (i) storage clusters, (ii) application databases, (iii) execution logs, and (iv) database writes and reads.

12. The method of claim 11, wherein the transaction information includes at least one of: (i) input events, (ii) sequential events, (iii) read events, (iv) successful sequential events, (v) failure sequential events, (vi) successful disjointed events, and (vii) failure disjointed events.

13. The method of claim 10, wherein the classifier recorder and tagger platform further identifies at least one weighted transaction failure.

14. The method of claim 10, wherein the recommendation engine platform is further coupled to an algorithm data set and a recommendation data set.

15. The method of claim 10, wherein the graph engine relation builder platform is further coupled to a data structure set.

16. A non-transitory, computer readable medium having executable instructions stored therein, the medium comprising:
- instructions to receive, at a transaction observer platform, transaction information associated with execution of an application in a cloud computing environment, the transaction information comprising a plurality of log or database transactions performed during execution of the application;
- instructions to automatically tag the transaction information by a classifier recorder and tagger platform, and to identify one or more cache misses;
- instructions to receive the tagged transaction information and automatically create, by a graph engine relation builder platform, graph information representing execution of the application, the graph information comprising a graph model having a plurality of nodes and edges disposed between the plurality of nodes, each of the edges being associated with a weighted dependency, the graph engine relation builder platform to refine the graph model responsive to processing a plurality of event failure scenarios and a learning set of expected error messages, wherein in response to refining the graph model, at least one of the edges being associated with a negative value weighted dependency; and
- instructions to receive the graph information and automatically generate and transmit, by a recommendation engine platform, an application performance optimization recommendation based, at least in part, on the identification of the one or more cache misses or system crashes.

17. The medium of claim 16, wherein the transaction information received by the transaction observer platform is associated with at least one of: (i) storage clusters, (ii) application databases, (iii) execution logs, (iv) database writes and reads; (v) input events, (vi) sequential events, (vii) read events, (viii) successful sequential events, (ix) failure sequential events (x) successful disjointed events, and (xi) failure disjointed events.

18. The medium of claim 16, wherein a test console simulator module receives information from the graph engine relation builder platform and provides data to a cloud platform.

19. The medium of claim 18, wherein the test console simulator module includes:
- a simulator executor to receive the information from the graph engine relation builder platform and executes a simulation in at least one of: (i) a hypervisor environment and (ii) a container environment, and
- an environment allocator to receive information about the simulation execution and to provide data to the cloud platform.

20. The medium of claim 16, wherein the application performance optimization recommendation is transmitted to an application platform interface.

* * * * *